United States Patent
Summers et al.

[11] 3,906,977
[45] Sept. 23, 1975

[54] REVERSE ACTING SAFETY RELIEF DEVICE

[75] Inventors: Stanley E. Summers, Woodland Hill; Werner M. Dudzik, Downey, both of Calif.

[73] Assignee: Black, Sivalls & Bryson, Inc., Tulsa, Okla.

[22] Filed: Nov. 30, 1970

[21] Appl. No.: 93,691

[52] U.S. Cl. ............................ 137/71; 220/89 A
[51] Int. Cl. .................................... F16k 17/40
[58] Field of Search ........................ 220/89 A; 137/68–71

[56] References Cited
UNITED STATES PATENTS

| | | | |
|---|---|---|---|
| 2,320,211 | 5/1943 | Bloom et al. | 220/89 A |
| 2,336,490 | 12/1943 | Vico | 220/89 A |
| 2,856,096 | 10/1958 | Philip | 220/89 A |
| 3,294,277 | 12/1966 | Wood | 220/89 A |
| 3,467,120 | 9/1969 | Hill et al. | 137/68 |
| 3,485,082 | 12/1969 | Myers | 137/69 X |

Primary Examiner—William R. Cline
Assistant Examiner—Richard Gerard
Attorney, Agent, or Firm—Lyon & Lyon

[57] ABSTRACT

A reverse acting, safety relief device is disclosed which comprises a pre-assembled unit of a pre-bulged, frangible diaphragm, a knife blade, and support means for the knife blade to position it in axial proximity to the concave side of the frangible diaphragm whereby the diaphragm will be impaled on the blade when it snaps over center and reverses its position. The support means comprises a sleeve in which the knife blade is mounted and which supports the annular flange of the diaphragm. The sleeve also supports line mounting means in the form of a thin, annular flange that can be engaged between mating flanges of piping to support the unit in a fluid tight seal.

15 Claims, 4 Drawing Figures

INVENTORS
STANLEY E SUMMERS
BY WERNER M. DUDZIK

ATTORNEY

REVERSE ACTING SAFETY RELIEF DEVICE

DISCLOSURE OF THE INVENTION

This invention relates to safety relief devices, and, in particular, relates to reverse acting devices which can be readily inserted into a pressured system without requiring any substantial modifications to the piping of the system.

Reverse acting, frangible diaphragms typically comprise a frangible disc member having a central dome convexly oriented towards the inlet of the relief device. The device includes a knife blade supported by its outlet flange in axial proximity to the concave side of the disc member to impale the member when it responds to excessive upstream pressure and snaps over center.

The device fails when the upstream pressure exceeds the design relief pressure and exerts an axial force on the disc member which is sufficient to cause elastic instability in the transition, i.e., the arcuate junction between the central dome and integral flange, of the disc member. The disc responds by snapping over center and reversing its upstream face from a convex to a concave configuration. A knife blade mounted downstream of the disc impales the latter when the disc snaps over center.

An advantage of the reverse acting relief devices is their precision of operation. Because the elastic instability of the disc member is reproducible with a high degree of precision, the device can be safely operated at up to 90 percent of its design relief pressure, thereby providing considerable savings in pressure equipment construction. To obtain this precision in operation, the transition of the disc member, i.e., the frangible diaphragm, must be supported by the downstream flange. Unfortunately, ordinary piping flanges do not have the precise tolerances for this service, and, accordingly, special mounting flanges are necessary to support the diaphragm. These flanges are relatively thick and, with the flange of the knife blade holder, require that the flanges of a piping joint be expanded a considerable distance to install the device. Consequently, installation of the conventional reverse acting, safety relief device requires substantial modification of piping of a pressure relief system.

The safety relief device of this invention insures precision of operation and can be installed between flanges of existing piping without requiring any substantial modifications to the piping. This device comprises an assembly of a knife blade, cylindrical blade holder, frangible diaphragm, and a single mounting flange. The entire assembly is sized to permit its insertion into the piping with its mounting flange projecting radially outwardly so that it may be secured in a fluid tight seal between mating flanges of the piping. This flange can have the configuration necessary for fitting any of the various flange faces commonly in use. The knife blade is mounted on the inner periphery of the mounting flange and the frangible diaphragm is supported by the downstream end of the assembly. This unit is, preferably, preassembled with the diaphragm mounted under factory conditions where precision in its mounting insures that its transition is supported in the assembly.

The invention will now be described in reference to the FIGURES, of which:

Figure 1:
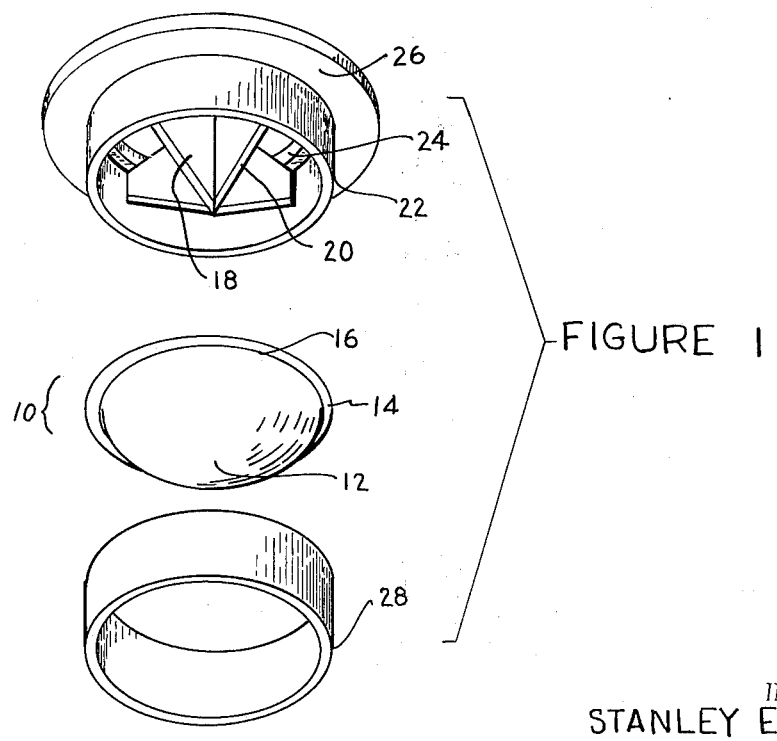
FIG. 1 is an exploded view of an assembly of the invention.

Referring now to FIG. 1, a device of the invention is shown in exploded view. This unit comprises a prebulged, frangible diaphragm 10 having a central dome portion 12 and an annular flange 14 with an arcuate transition 16 therebetween. The knife blade means is shown as a pair of blades 18 and 20 which are at right angles to each other. The blades are shown with a generally V-shape having their apexes directed towards the concave side of diaphragm 10 and are supported within sleeve 22. Preferably, the upper edges of the blades are supported by rim 24 which is an extension of flange 26. The blades can be welded to the sleeve or to rim 24. Alternatively, the blade assembly can be removably supported in the sleeve and can be locked in the sleeve by pin means, etc.

Mounting means are provided to permit securing of the unit in piping. This is shown as annular flange 26 which projects from sleeve 22 a sufficient distance to provide an annular sealing surface when engaged between flanges of a piping joint. The particular flange shown is flat for engagement between piping flanges having flat raised flat faces. As described hereinafter, other configurations of this flange can be used to fit other conventional piping flanges.

Frangible diaphragm 10 is supported by the upstream end of sleeve 22. The annular flange 14 is fitted onto the end surface of sleeve 22 and secured thereto by suitable means, e.g., by a continuous edge or fusion weld between the flange and sleeve 22.

A second sleeve, shown at 28, can be included in the assembly on the upstream side of flange 14. This sleeve, as diaphragm 10, can be secured in the assembly by a continuous edge or fusion weld or by spot welding. The sleeve 28 protects diaphragm 10 during its handling and installation. The sleeve also provides support for the transition 16 of diaphragm 10 during pressure reversals in the system, i.e., when the pressure downstream of diaphragm 10 exceeds the pressure upstream of the diaphragm. Accordingly, units which include sleeves 28 are preferred embodiments of the invention.

The diaphragms are conveniently formed into the prebulged configuration by assembly of a flat metal stock onto sleeve 22, preferably between sleeves 22 and 28, followed by the application of sufficient pressure to bulge the diaphragm into the illustrated shape. This is performed by the application of a pressure up to about 70 to 85 percent of the pressure which would rupture the diaphragm. Those skilled in the art can readily select the metal and its necessary thickness of metal to obtain the desired snap over pressure of the diaphragm when it is installed with its convex side oriented towards the system pressure. Typically, mild or stainless steel is used to manufacture the diaphragms in thicknesses from about 0.5 to about 20 mils, generally from about 1 to about 10 mils.

Support for the transition 16 of diaphragm 10 by the lower edge of sleeve 22 can be insured by providing sleeve 28 with a slightly greater inside diameter than sleeve 22. When the diaphragm 10 is formed into the prebulged shape, the transition 16 is shaped against the shoulder of the inside edge of sleeve 28. The resultant transition will, therefore, be outside of the inside edge of sleeve 22 and will be supported by the sleeve. Alternatively, the inside shoulder of sleeve 28 can be formed with a greater radius of curvature than that of sleeve 22. During bulging of the diaphragm 10, the transition will be formed against this shoulder having the greater radius and the transition will, therefore, be outside of the inside shoulder of sleeve 22 and will be supported by this shoulder.

Figure 2:
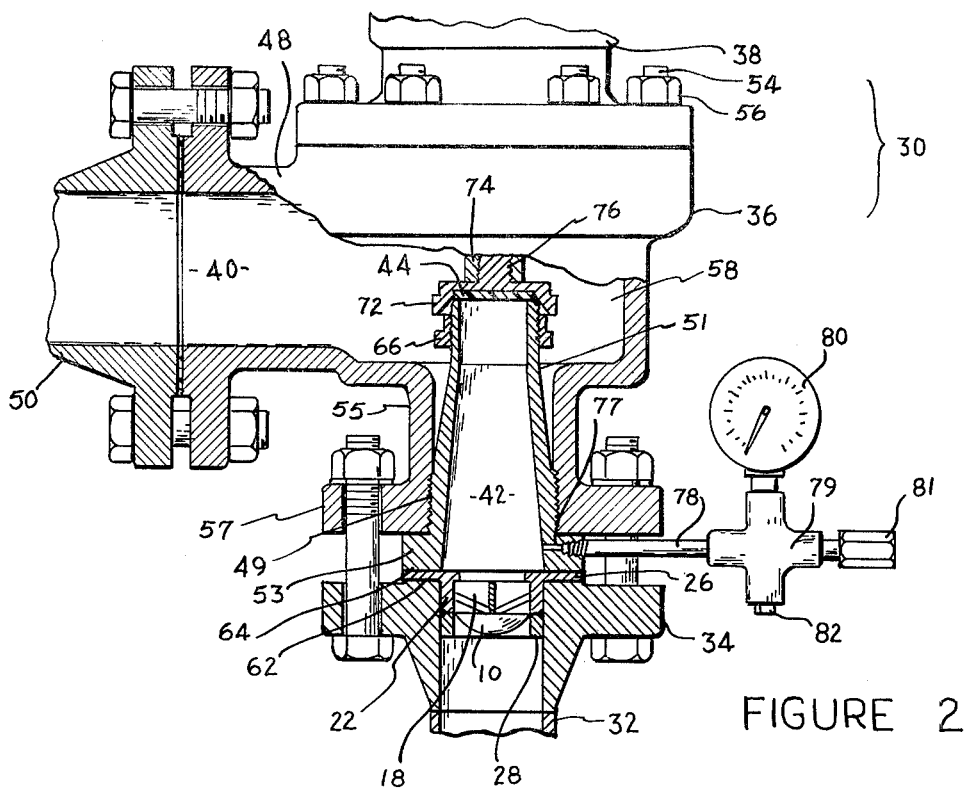
FIG. 2 illustrates a particular use of the device of the invention to isolate a safety relief value.

FIG. 2 illustrates a typical installation of the device of this invention. The device is shown in use as an isolation means for pressure relief valve 30. The valve is connected to piping 32 having flange 34. The piping connects to a pressure system having vent means for discharge of fluids therefrom. The relief valve is a conventional relief valve with a housing formed of body 36 and bonnet 38 with an outlet port 40 and an inlet port 42 which are disposed at right angles to provide an in-line mounting of the valve closure member with the inlet port. The valve closure member is disk 44 which is biased into a closed position by spring means that is within bonnet 38.

Body 36 has neck 48 which bears a conventional flange for attachment to downstream discharge piping such as flanged conduit 50. The upper surface of body 36 has a flanged face with tapped bores for the attachment of bonnet 38 with studs 54 and nuts 56. The housing contains valve cavity 58. Body 36 also has neck 55 which bears flange 57 for removable attachment to flange 34. The inside surface of neck 55 has means such as threads 49 for the removable attachment of nozzle 51. This nozzle has a flange 53 and a gasket (not shown) with a thickness of about one-sixteenth inch when it is conventionally mounted directly against flange 34.

Nozzle 51 projects into cavity 58 and terminates therein to support valve seat means for the valve closure member. The end of nozzle 51 is threaded and a ring 66 is placed on the nozzle so that rotation of the ring retracts or extends the ring on the nozzle. The housing has a threaded tap and a lock screw is inserted therein and into engagement with ring 66 to lock the ring against rotation; the latter elements are not shown in the figure.

The valve closure means comprises disk closure member 44 which is mounted within the inverted cup-shaped holder 72 by threaded boss 76 which is turned into a threaded tap in valve stem rod 74. The inside wall of holder 72 is bevelled as shown and the bevelled wall can be engaged by ring 66 when the latter is extended over the end of the nozzle, thereby permitting the retention of the valve in a partially open position for blow down service. In normal operation, ring 66 is locked in a retracted position on the nozzle.

Rod 74 is reciprocatably mounted within sleeve means in bonnet 38 and is biased into a closed position by spring means that is contained within bonnet 38. The tension on this spring means is adjustable to provide for control of the relief pressure of the valve.

The relief device of this invention can be installed in the aforedescribed assembly by relatively simple modifications to the nozzle 51 and without any alterations in the downstream piping 50. A relatively thin gasket 62 is placed on the raised face of flange 34 and the relief device assembly is placed in piping 32 with its mounting flange 26 against gasket 62. A second thin gasket 64 is placed between the downstream side of flange 26 and flange 53. In a typical installation, the gasket commonly used, which has a thickness of about 0.067 inch is removed. Flange 26 has a thickness of about 0.125 to 0.201 inch, preferably 0.135 inch and gaskets 62 and 64 have a thickness of 0.015 inch each. The complete installation thus raises the relief valve 0.098 inch, a distance that is within the tolerances for bolted flanges and, accordingly, the outlet flange of the relief valve can still be fitted to the flange of the discharge piping 50.

The nozzle 51 is modified slightly for the installation. This modification comprises radial bore 77 which is tapped into the edge of flange 53. Conduit 78 is fitted into this tapped bore and bears, at its outboard end, cross 79 with pressure gauge 80, bleed valve 81 and plug 82. The plug can be removed and a source of compressed gas can be attached to permit testing of the set relief pressure of the relief valve without interrupting the service of the pressure system since diaphragm 10 isolates the valve from the system pressure.

Figure 3:
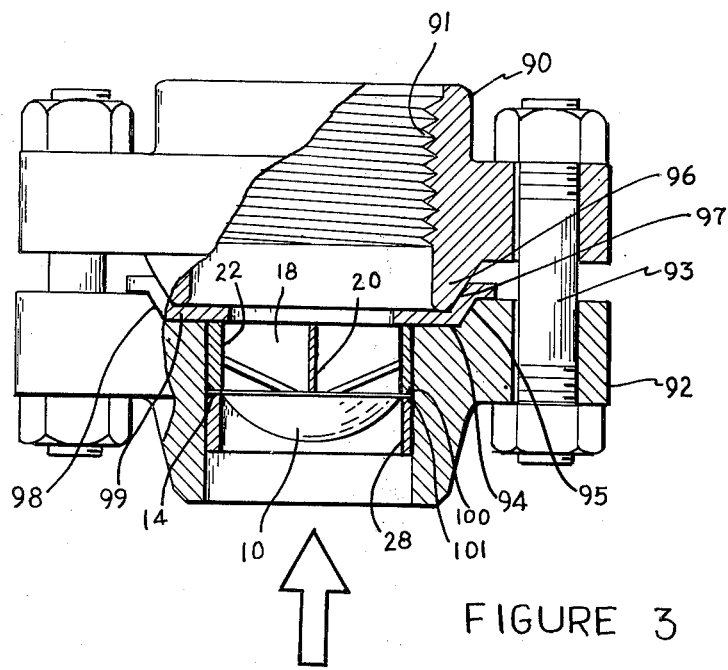
FIGS. 3 and 4 illustrate installation of the device of the invention in different piping assemblies.

FIG. 3 shows the device installed between flanges having a ring joint facing. The downstream flange 90 has a central bore with threads 91 for engagement of the downstream piping. The upstream flange 92 has a conventional bevelled edge for a welded attachment to upstream piping and the flanges are secured together in a conventional manner with bolts 93.

The upstream flange has a recessed face 94 with inclined sidewall 95 and the downstream flange 90 has a raised rim 96 which has an inclined outer sidewall 97 that mates with sidewall 95 of the upstream flange. The mounting flange of the relief device is cup-shaped to fit the recessed face 94 of the upstream flange with an inclined sidewall 98 that is engaged in the ring joint between the mating sidewalls 95 and 97 of the flanges. Conventional gaskets (not shown) can be used to maintain a fluid tight seal in the joint.

The remainder of the relief device is substantially the same as previously described. The knife blades 18 and 20 bear against the inside edge of flange 99. A sleeve 22 can be used to support the annular flange 14 of the frangible diaphragm 10 and sleeve 28 can be included in the assembly to protect the diaphragm. As previously described, a continuous edge weld 100 can be used to secure the diaphragm to sleeve 22 and a similar weld 101 can be used to secure sleeve 28 to the assembly. The inside diameter of sleeve 28 is shown as having a slightly greater diameter than that of sleeve 22 so the diaphragm, when it is bulged against the sleeve 28 will have a transition which will have a greater diameter than the inside diameter of sleeve 22. This insures that the edge of sleeve 22 will support the transition of the diaphragm.

Figure 4:
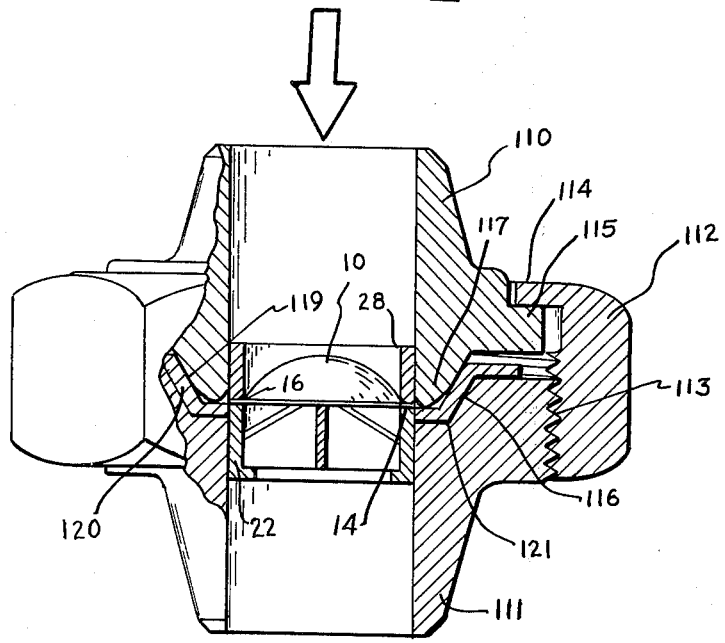

FIG. 4 illustrates a slightly different embodiment that is installed in a conventional union type assembly. This assembly comprises flange members 110 and 111 which are held in assembly by retainer 112. The flange members are welded to piping. The upstream flange member 110 has an annular rim 115 and the downstream flange member has a threaded outer edge 113. The retainer 112 has a threaded inside edge to engage threaded edge 113 with an inside rim 114 that engages rim 115 of member 110. The flange members are engaged in a ring joint that is formed by recessed face 121 on flange member 111 with inclined sidewalls 116. The upstream flange member 110 has a raised rim 117 that has an inclined sidewall 119 that mates with sidewall 116 of member 111.

The relief device as shown has a mounting flange 120 which is cup-shaped with an inclined sidewall that fits between sidewalls 116 and 119 with conventional gaskets (not shown) to provide a fluid tight seal. Mounting flange 120 supports the relief assembly of sleeve 28, diaphragm 10 and sleeve 22. The assembly can be mounted at any varied axial spacing in the joint by securing flange 120 at any position along sleeves 28 or 22. Flange 120 can be welded to the assembly or attached by any other suitable means. The remainder of the assembly is substantially the same as that described in FIGS. 1-3.

The inside edge of the end of sleeve 28 which bears against flange 14 of diaphragm 10 is shown with a radius of curvature that is greater than the radius of curvature of the inside edge of the end of sleeve 22 that supports the diaphragm. This insures that the transition 16 of the diaphragm will be formed with a slightly greater diameter than the inside diameter of sleeve 22 so that the latter sleeve will support the transition.

The invention has been described with regard to specific illustrations of presently preferred embodiments. It is not intended that this illustration of the preferred embodiments be construed as unduly limiting of the invention. Instead, it is intended that the invention be described by the elements and their obvious equivalents set forth in the following claims.

We claim:

1. A reverse acting, frangible relief device adapted for mounting as a unit within piping at a flanged piping joint which comprises an assembly of a frangible reverse acting diaphragm having a central dome portion and an annular flange with a transition therebetween, retaining means supporting said annular flange comprising a first sleeve of sufficient diameter for insertion into the bore of said piping with the annular flange of said diaphragm secured thereto, said sleeve having a thin, annular mounting flange projecting outwardly therefrom with a sufficient diameter for engagement between mating flanges of said piping joint, knife blade means supported by said first sleeve in axial proximity to the concave side of said diaphragm and separated therefrom by said first sleeve a sufficient distance whereby said diaphragm will be impaled by said knife blade means only when said diaphragm is caused to snap over center and reverse its position, and a second sleeve, also having a sufficient diameter for insertion into the bore of said piping, positioned about the upstream, convex side of said diaphragm whereby to protect it during its installation and handling.

2. The device of claim 1 wherein said first sleeve has an inside diameter slightly less than the diameter of the transition of the diaphragm whereby the downstream side of the diaphragm is supported along its transition.

3. The device of claim 1 wherein the second sleeve member surrounding the diaphragm has an inside shoulder bearing against the diaphragm which has a radius of curvature that is greater than the radius of curvature of the inside edge of the sleeve member supporting the annular flange of said diaphragm to thereby support the transition of said diaphragm.

4. The device of claim 1 wherein the inside diameter of said second sleeve member surrounding the diaphragm has a greater diameter than that of said sleeve of said retaining means to thereby support the transition region of said diaphragm.

5. The device of claim 1 wherein said thin annular flange is secured at one end of said sleeve of said retaining means.

6. The device of claim 5 wherein said thin annular flange is secured at the discharge end of said sleeve of said retaining means.

7. The device of claim 5 wherein said thin annular flange projects inwardly of said sleeve of said retaining means to provide an inside annular shoulder for axial support of said knife blade means.

8. The device of claim 1 wherein said thin annular flange is cup-shaped with an inclined side wall to fit piping having ring-joint flanges.

9. The combination of relief piping, a piping flange, a relief valve having a flanged base secured thereto and having a tapered inlet nozzle mounted beneath said base with a reverse acting, frangible relief device mounted as a unit assembly within the bore of said piping, said assembly comprising: (1) a frangible reverse acting diaphragm having a central dome portion and an annular flange with a transition therebetween; (2) retaining means supporting said annular flange comprising a sleeve positioned in the bore of said piping with the annular flange of said diaphragm secured thereto; (3) a thin annular flange secured to the discharge end of said sleeve and projecting outwardly between the mating flanges of said piping and said relief valve; and (4) knife blade means supported by said sleeve in axial proximity to the concave side of said diaphragm and separated therefrom by said sleeve a sufficient distance whereby said diaphragm will be impaled by said knife blade means only when said diaphragm is caused to snap over center and reverse its position.

10. A preassembled relief valve isolator comprising a tubular cylindrical member adapted to fit within a relief exit of the piping of a fluid pressure system, said member having a relatively thin flange at one end thereof for engagement with the end of said piping at said exit, a rupture disc having a central dome and a generally flat annular flange surrounding said dome and integral therewith at a circular transition between the outer periphery of the dome and the inner periphery of said annular flange, said disc being secured around its said annular flange to the other end of said tubular cylindrical member with the convex side of the dome directed away from said tubular cylindrical member and with the dome adapted to snap on overpressure in said system into said tubular cylindrical member, and knife means in said tubular cylindrical member for cutting the dome when it snaps.

11. A relief valve isolator comprising:
a tubular cylindrical member adapted to fit within a relief exit of the piping of a fluid pressure system, said member having a relatively thin flange for engagement with the end of said piping at said exit;
a rupture disc having a central dome and an annular flange surrounding said dome and integral therewith, said disc being secured around said annular flange to one end of said tubular cylindrical member with the convex side of the dome directed away from said tubular cylindrical member and with the dome adapted to snap on over pressure in said system into said tubular cylindrical member; and
knife means in said tubular cylindrical member for cutting the dome when it snaps.

12. The relief valve isolator of claim 1 wherein said relatively thin flange is located at one end of said tubular cylindrical member and said dome is located at the other end of said tubular cylindrical member.

13. The relief valve isolator of claim 1 wherein said annular flange surrounding said dome is generally flat.

14. The relief valve isolator of claim 1 wherein a second tubular cylindrical member is positioned about said dome on the other side of said annular flange surrounding said dome from said tubular cylindrical member.

15. The relief valve isolator of claim 1 wherein said knife means is preassembled with said tubular cylindrical member.

* * * * *